Figure 1:
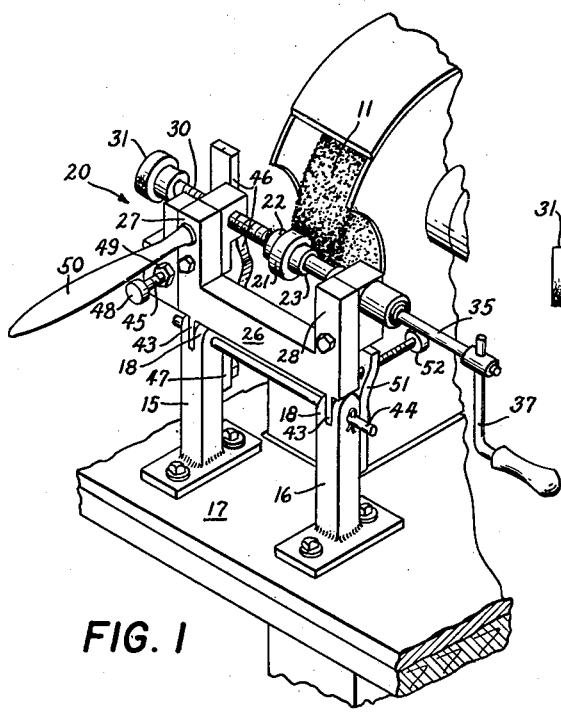

July 7, 1953

C. K. CHATTEN 2,644,277

MACHINE FOR PREPARING TEST SAMPLES
OF RUBBER AND THE LIKE MATERIAL
Filed April 19, 1951

INVENTOR.
CLARENCE K. CHATTEN

BY
D. C. Snyder
Roderick B. Jones
ATTORNEYS

Patented July 7, 1953

2,644,277

UNITED STATES PATENT OFFICE 2,644,277

MACHINE FOR PREPARING TEST SAMPLES OF RUBBER AND THE LIKE MATERIAL

Clarence K. Chatten, Jackson Heights, N. Y.

Application April 19, 1951, Serial No. 221,909

3 Claims. (Cl. 51—105)

The invention described herein may be manufactured and used by or for the Government of the United States of America without the payment of any royalties thereon or therefor.

This invention pertains to the art of machining, and it pertains particularly to th art of machining rubber and the like materials that yield under pressure and are subjected to deformation under stress. The invention is embodied in apparatus that is particularly adapted to machine rubber and the like material precisely to accurate dimensions.

The apparatus of the present invention is especially useful to produce samples of rubber or the like material that must be accurate volumetrically and dimensionally. Such samples may be either strips of the material with accurate and uniform thicknesses, or they may be circular discs the diameters and thicknesses of which are precisely accurate. Such samples are suitable for making various kinds of tests.

The present invention comprises an attachment by means of which rubber or rubber-like materials can be machined cylindrical to precise diameters. Samples of the material can thus be machined to precise volumetric dimensions, and to precise surface dimensions and contour.

Figure 2:
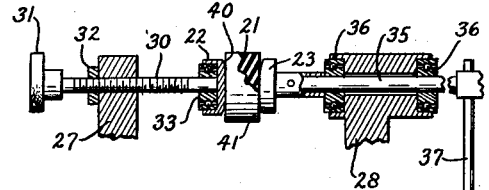
Figure 3:
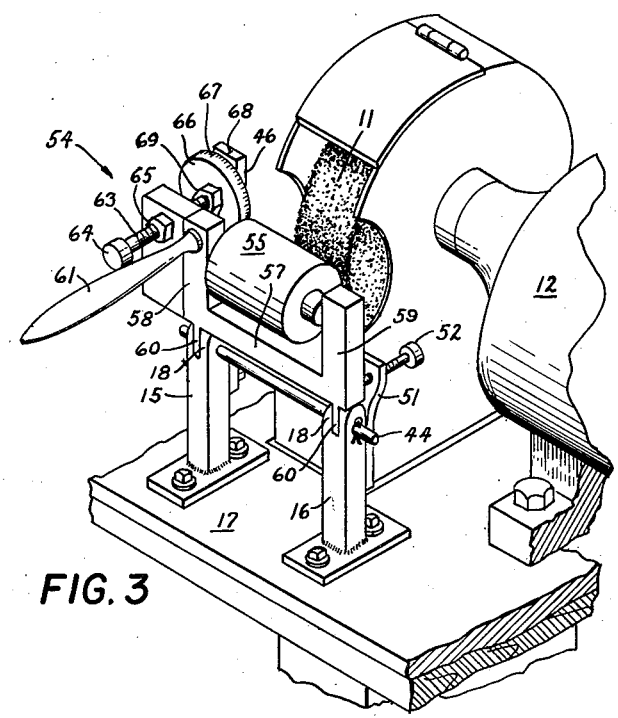
Figure 4:
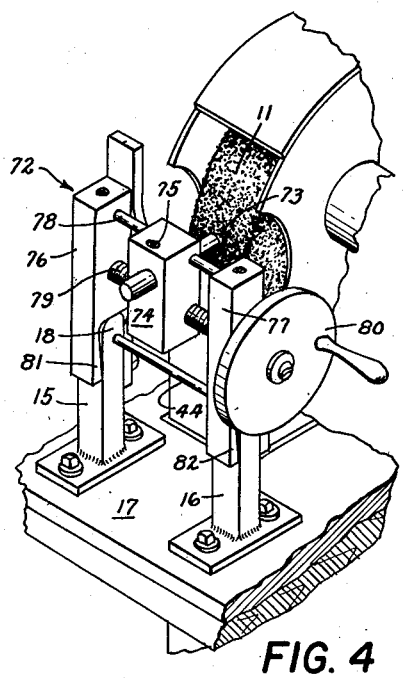

The principles of the invention, and the structure of a practical embodiment thereof, will be clear from the accompanying drawings to which attention is now directed. In the drawings:

Fig. 1 is a perspective of the machine of the present invention set up for machining material circular, Fig. 2 is a cross-sectional elevation along the longitudinal centerplane of the attachment in the machine of Fig. 1, Fig. 3 is a perspective similar to Fig. 1, showing the machine of the invention set up for machining strip material precisely to accurate thickness, and Fig. 4 is a perspective similar to Figs. 1 and 3, illustrating the machine of the invention set up for dressing the grinding wheel of the machine.

The machine of the disclosure comprises a power-driven grinding wheel 11, which can be embodied in a conventional prior-art bench grinder in which the grinding wheel is driven by motor 12, Fig. 3.

The bench grinder 11, 12, is provided with a work support, the base of which comprises a pair of upright posts 15 and 16 rigidly secured to the base plate 17. Posts 15 and 16 comprise bearings 18 constituting a pivotal support for mounting several attachments alternatively, each serving a different purpose.

The attachment 20, Fig. 1, serves to machine material 21 circular, and comprises a holder for the material embodying a pair of abutment heads 22 and 23 between which the piece of material 21 is held. A mount for the abutment heads comprises a bracket embodying a crosspiece 26, and at respective opposite ends of the crosspiece a pair of projecting arms 27 and 28 respectively at the left and right.

Abutment head 22 is carried by the shaft 30, which is screw-threaded through the arm 27 towards the arm 28, and traverses the abutment head 22 towards and away from the opposed abutment head 23 supported by the opposite arm 28. The handle or knob 31 is provided at the end of shaft 30 remote from abutment head 22 to facilitate its manual rotation. Lock nut 32 holds the screw 30 in adjusted position. The abutment head 22 is secured to the end of shaft 30 by means of the roller bearing 33, Fig. 2, by means of which the abutment head is rotatable on the axis of the shaft 30.

The abutment head 23 is rigidly secured to the shaft 35 which is mounted on the arm 28 in roller bearings 36. The crank handle 37 is secured to the shaft 35 at its end away from abutment head 23, and facilitates manual rotation of the abutment head 23.

The shafts 30 and 35 are supported by the bracket of attachment 20 coaxially of each other, with their respective abutment heads 22 and 23 positioned in opposed relationship. The opposed faces 40 and 41 of the respective abutment heads 22 and 23 are coaxial with their shafts 30 and 35, and are domed slightly as shown, the curvature of each face 40 and 41 being on an arc with its center on the axis of its respective shaft 30 or 35.

With a piece 21 of the material positioned between the abutment heads 22 and 23, the knob 31 is rotated to bear the abutment face 40 against the piece 21, and to clamp the piece against abutment face 41. The piece 21 is rotated on an axis through its thickness by frictional engagement with abutment face 41 when the crank handle 37 is rotated, and the abutment head 22 is rotated on bearing 33 by its frictional engagement with the piece 21. The lock nut 32 can be tightened to inhibit any tendency of the shaft 30 to rotate with the abutment head 22, and thereby change the magnitude of clamping engagement between the abutment heads 22 and 23.

The bracket of attachment 20 comprises the bearings 43 projecting from crosspiece 26, which are companion to the bearings 18 of the base 16, 17, and with pin or shaft 44 form a pivot for swinging the bracket up and down, and towards and away from grinding wheel 11. Bearings 18 are positioned in base 16, 17 parallel with the shaft of wheel 11. Bearings 43 are positioned in the bracket 26, 27, 28 parallel with the axis of shafts 30 and 35, whereby the axis of rotation of abutment heads 40 and 41 is held parallel with the axis of rotation of wheel 11. The bracket of attachment 20 is constructed for the axis of shaft 30 and 35 to move generally towards or away from the axis of wheel 11, and thus, material 21 clamped between the abutment heads 22 and 23 is movable into and out of machining engagement with the grinding wheel 11 by swinging the bracket of 20.

The screw 45 is projected through the arm 27 into abutting engagement with the fixed abutment stop 46, which is secured to post 16 at 47 and projects upwardly into position opposite the screw 45. Stop screw 45 comprises a handle or hand knob 48 for adjusting its position with reference to the stop 46, to govern the distance between the axis of shafts 30 and 35 and the axis of grinding wheel 11, and thereby control and determine the diameter to which the material 21 is ground.

Handle 50 is secured to the arm 27 at the left of bracket of 20, to swing the bracket 26, 27, 28 towards or away from the grinding wheel and hold the piece 21 in engagement therewith. The operator holds the handle 50 in his left hand, and presses the piece 21 against the grinding wheel 11 during the grinding operation. At the same time he rotates the crank handle 37 with his right hand, and thereby feeds the work 21 to the grinding wheel 11 to turn the piece circular. The piece 21 is originally cut along its peripheral edge to any regular or irregular contour, but large enough to include the finished diameter of the piece. The piece is ground to circular contour by the attachment of Fig. 1, the diameter being determined by the setting of stop screw 45.

The piece 21 is clamped tightly between the abutment heads 22 and 23 during the first stages of the grinding operation, thereby holding the piece firmly enough to prevent it from slipping under the machining stress. When the desired finished diameter is approached, the piece 21 is clamped less tightly by the knob 31 being rotated to retract the abutment head 22 accordingly. The stop screw 45 is also reset for the finished diameter of the piece 21, which is reached when, with the stop screw 45 held against the abutment stop 46, the piece 21 is not ground when the crank handle 37 is rotated. The piece 21 is thereby ground to precise peripheral dimension and to cylindrical contour.

An additional limiting stop is provided to insure against damage to the machine, and particularly to prevent the abutment heads 22 and 23 from coming into contact with the grinding wheel 11 and becoming abraded thereby. The bar 51 is secured to the post 16, and projects upwardly into position opposite the arm 28. Screw 52 extends through the bar 51 and projects towards the arm 28 into engagement therewith. The screw 52 is adjusted to limit movement of the axis of shafts 30 and 35 towards the grinding wheel 11, the adjustment being set so that the abutment heads 22 and 23 are held out of engagement with the grinding wheel 11 at all times.

It has been presumed up to now that the piece 21 was originally of uniform thickness with parallel side faces. The workpiece 21 can be produced beginning with a piece of material of completely irregular surface contour. The original piece of irregular material is first machined to comprise a flat surface. It is then machined to comprise an opposite parallel surface which is also flat, and it is machined to provide the desired thickness between the opposite parallel faces. The piece 21 of Fig. 1 is then cut from this piece and is machined cylindrical in the manner described hereinbefore.

The attachment 54, illustrated in Fig. 3, is adapted to machine a piece of material precisely to desired thickness with its opposite faces flat and parallel to each other. The work-support mount of Fig. 3 comprises a roller 55, and a bracket that supports the roller 55 rotatable on its axis, the bracket comprising the crosspiece 57 and the respective left and right arms 58 and 59 which project from the crosspiece 57 and comprise bearings for the roller 55.

Bearings 60 of attachment 54 are companion to the bearings 18 of the base 15, 16, and with the pin or shaft 44 constitute a pivot on which the bracket 57, 58, 59 swing up and down on the base, towards and away from the grinding wheel 11. The axis of bearing 60 is positioned in the bracket of attachment 54 parallel to the axis of the roller 55 to position the roller 55 parallel with wheel 11. The bracket 57, 58, 59 is constructed to move the axis of roller 55 towards or away from the axis of grinding wheel 11 when the bracket swings on pivot 18, 60, 44, whereby the surface of roller 55 is positionable opposed to the face of the grinding wheel 11. Handle 61 is secured to the arm 58 to swing the bracket manually on its pivot 18, 60, 44, and to hold the face of the roller opposed to and pressed towards the grinding wheel 11.

The bar 51 with its screw 52 comprise a limiting stop opposed to the arm 59 of the bracket, to prevent the surface of the roller 56 from contacting the grinding wheel 11 and becoming abraded thereby.

The stop screw 63 is threaded through the arm 58 of the bracket, and projects towards the fixed limiting stop 46. The handle or knob 64 is provided to traverse the screw 63 towards or away from the opposed abutment surface of the limiting stop 46, to thereby adjust the space between the surface of roller 55 and the face of the grinding wheel 11, the lock nut 65 being provided to fix the setting of the screw 63. The dial 66 is carried by the screw 63 near its end adjacent to the stop 46, and is held in fixed position thereon by the locknut 69. The dial 66 comprises the peripheral scale 67 located to register with the indicator line 68 on the post of stop 46. The scale 67 is calibrated in increments of space between opposed faces of the roller 55 and the grinding wheel 11.

A piece of material, for example in strip form, is positioned on the surface of the roller 55. The bracket of attachment 54 is swung up and held to abut its screw 63 against fixed stop 46. With handle 61 in the left hand, the material is guided with the right hand to pass between the opposed faces of the roller 55 and the grinding wheel 11. If necessary, the material is ground to first make its one face smooth and even, and is then turned over on the face of roller 55 and is guided with the right hand for passage between the roller 55 and grinding wheel 11 to make its other face smooth. This operates to machine the opposite faces of the piece parallel to each other. The stop screw 63 is adjusted from time to time for desired depths of successive cuts, and when the screw has been adjusted for the desired final thickness as determined by the scale 67, the material is passed between the roller 55 and grinding wheel 11 several times to grind the material to the desired thickness, this being determined when the material passes over the roller 55 without contacting the grinding wheel 11.

The attachment 54 of Fig. 3 is the same as is disclosed in the hereinbefore referred to copending application, Serial No. 103,282, filed July 6, 1949, by means of which strip samples of rubber and the like compressible material are machined to precise thickness. The additional attachment of Fig. 1 in the present application extends the usefulness of the machine of the copending application to the production of samples which are precisely dimensioned volumetrically, and to predetermined surface area and contour. This enables test samples of various kinds for various different tests, consisting of rubber and the like material, to be machined on the single machine of the present application.

It is important, for machining material to precise dimension of thickness, as also for machining material precisely cylindrical to precise diameter, that the face of the grinding wheel 11 be parallel to the axis of the material backing roller 55, and also parallel to the axis of the shafts 30 and 35. An attachment is provided for dressing the face of the grinding wheel 11, and this attachment is disclosed in Fig. 4.

The wheel-dressing attachment 72 embodies the dressing tool 73 and a bracket comprising a mount therefore. The bracket of attachment 72 comprises a carriage 74, to which the dressing tool 73 is secured by means of the set screw 75. A pair of arms 76 and 77 are attached to each other by means of the crosspiece 78, and provide bearings for the traversing screw 79 which is threaded through the carriage 74. The hand crank 80 is secured to the traversing screw 79 to rotate it for traversing the carriage 74 along the crosspiece 78, which is also projected through the carriage 74 and forms a sliding guideway for travel of the carriage.

The bracket of arms 76 and 77 also comprises bearings companion to the bearings 18 of the base 15, 16, whereby the bracket is secured to the base 15, 16 by means of the pin or shaft 44. The arms 76 and 77 comprise the respective downwardly directed abutment fingers 81 and 82, which bear against the respective posts 15 and 16, and limit the swing of the attachment 72 on the pivot of pin 44 in the direction away from grinding wheel 11. The bearings for pin 44 are positioned in the bracket of attachment 72 to be parallel with the axis of traversing screw 79, which is thus located parallel with the axis of grinding wheel 11. The bracket of attachment 72 is constructed for the dressing tool 73 to project towards the axis of wheel 11 into cutting engagement with the face thereof. The dressing tool 73 is adjustably positionable in the carriage 74 to press against the surface of the grinding wheel 11 in dressing engagement therewith, in opposed relationship to the abutment fingers 81 and 82 pressing against the respective posts 15 and 16 of the base and is held in adjusted position by the set screw 75.

When the traversing screw 79 is rotated by means of the hand crank 80, the dressing tool 73 travels along the face of the grinding wheel 11, and dresses it truly cylindrical. The wheel 11 is thus accurately dressed for machining the piece 21 truly cylindrical by means of the attachment 20 of Fig. 1, or for machining a strip of material accurately to desired thickness by means of the attachment 54 of Fig. 5, or for both.

The attachment 72 is the same as the dressing tool attachments disclosed in the referred to copending application Serial No. 103,282, filed July 6, 1949.

The machine of the disclosure is one practical embodiment of the invention, which is not limited to the specifically disclosed structure. The scope of the invention is determined by the accompanying claims.

What is claimed is:

1. In a machine, a base and a workholder adapted for swinging movement on said base into and out of operative position, said workholder comprising a bracket, a first shaft rotatably mounted in said bracket, means restraining said shaft from axial movement, a first disc-shaped abutment head fixedly mounted on the end of said first shaft, the face of the disc being substantially perpendicular to the first-shaft axis, a second shaft in axial alignment with said first shaft, said second shaft being screwed through said bracket to provide axial adjustment, said second shaft being normally nonrotatable when said first shaft rotates, locking means for selectively locking said second shaft to said bracket to prevent screwing thereof, a second disc-shaped abutment head rotatably mounted on said second shaft, the face of the disc being substantially perpendicular to the second-shaft axis, said second abutment head being in opposed relation to said first abutment head, and stop screw means on said base for limiting swinging movement of said workholder and to define said operative position.

2. In a machine a base and a workholder adapted for movement on said base into and out of operative position, said workholder comprising a bracket, a first shaft rotatably mounted in said bracket, means restraining said shaft from axial movement, a first disc-shaped abutment head fixedly mounted on the end of said first shaft, the face of the disc being substantially perpendicular to the first-shaft axis, a second shaft in axial alignment with said first shaft and mounted in said bracket for axial adjustment, said second shaft being normally nonrotatable when said first shaft rotates, locking means for selectively locking said second shaft to said bracket to prevent rotation and axial movement thereof, a second disc-shaped abutment head rotatably mounted on said second shaft, the face of the disc being substantially perpendicular to the second-shaft axis, said second abutment head being in opposed relation to said first abutment head, and means on said base for limiting movement of said workholder and to define said operative position.

3. A workholder comprising a bracket, a first shaft rotatably mounted in said bracket, means restraining said shaft from axial movement, a first disc-shaped abutment head fixedly mounted on the end of said first shaft, the face of the disc being substantially perpendicular to the first-shaft axis, a second shaft in axial alignment with said first shaft and mounted in said bracket for axial adjustment, said second shaft being normally nonrotatable when said first shaft rotates, locking means for selectively locking said second shaft to said bracket to prevent rotation and axial movement thereof, and a second disc-shaped abutment head rotatably mounted on said second shaft in opposed relation to said first abutment head, the face of said disc being substantially perpendicular to the second-shaft axis.

CLARENCE K. CHATTEN.

References Cited in the file of this patent

UNITED STATES PATENTS

| Number | Name | Date |
|---|---|---|
| 138,825 | Weiss | May 13, 1873 |
| 336,067 | Richards | Feb. 9, 1886 |
| 341,581 | Kirchner | May 11, 1886 |
| 359,439 | Gilroy | Mar. 15, 1887 |
| 393,811 | Beeson et al. | Dec. 4, 1888 |
| 548,985 | Hartley | Oct. 29, 1895 |
| 1,145,194 | Hansen | July 6, 1915 |
| 1,619,358 | Maynard | Mar. 1, 1927 |
| 1,659,560 | Bausch | Feb. 21, 1928 |
| 2,222,563 | Green | Nov. 19, 1940 |